US012812681B2

(12) United States Patent
Um et al.

(10) Patent No.: US 12,812,681 B2
(45) Date of Patent: Nov. 24, 2026

(54) METHOD AND APPARATUS FOR TRANSMITTING AND RECEIVING SIGNAL BETWEEN TERMINALS IN WIRELESS COMMUNICATION SYSTEM

(71) Applicant: ELECTRONICS AND TELECOMMUNICATIONS RESEARCH INSTITUTE, Daejeon (KR)

(72) Inventors: Jung Sun Um, Daejeon (KR); Hoi Yoon Jung, Daejeon (KR); Sung-Ik Park, Daejeon (KR); Nam Ho Hur, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 292 days.

(21) Appl. No.: 18/785,859

(22) Filed: Jul. 26, 2024

(65) Prior Publication Data

US 2025/0039933 A1 Jan. 30, 2025

(51) Int. Cl.
*H04W 74/00* (2009.01)
*H04L 27/26* (2006.01)
(Continued)

(52) U.S. Cl.
CPC ..... *H04W 74/0816* (2013.01); *H04L 27/2605* (2013.01); *H04W 74/0891* (2013.01); *H04W 92/18* (2013.01)

(58) Field of Classification Search
CPC ....... H04L 5/001; H04L 5/0048; H04L 5/005; H04L 27/2605; H04W 56/001;
(Continued)

(56) References Cited

U.S. PATENT DOCUMENTS 9,867,156 B2 1/2018 Lee et al.
11,653,321 B2 * 5/2023 Akkarakaran .... H04W 56/0015 370/336
(Continued)

FOREIGN PATENT DOCUMENTS

EP 4161203 A1 4/2023
WO 2019/169538 A1 9/2019
WO 2023/165970 A1 9/2023

OTHER PUBLICATIONS

Vivo, Channel access mechanism for sidelink on unlicensed spectrum, 3GPP TSG RAN WG1 #111, R1-2300453, 25 pages, Feb. 27-Mar. 3, 2023.*
(Continued)

*Primary Examiner* — Frank Duong
(74) *Attorney, Agent, or Firm* — Rabin & Berdo, P.C.

(57) ABSTRACT

A method of a first terminal may comprise: receiving a higher layer message including basic sidelink synchronization signal block (S-SSB) information on a basic S-SSB transmitted in an unlicensed band; obtaining a channel occupancy time (COT) through a listen-before-talk (LBT) procedure in the unlicensed band; and transmitting COT information including additional S-SSB configuration information to other terminals, wherein the basic S-SSB information includes information on a transmission occasion of the basic S-SSB and information on a frequency of the basic S-SSB, and the additional S-SSB configuration information includes information for transmission of an additional S-SSB that is transmitted in addition to the basic S-SSB within the COT.

20 Claims, 9 Drawing Sheets

(51) Int. Cl.
*H04W 74/08* (2009.01)
*H04W 74/0816* (2024.01)
*H04W 92/18* (2009.01)

(58) Field of Classification Search
CPC . H04W 56/0015; H04W 72/02; H04W 72/25; H04W 74/0808; H04W 74/0816; H04W 74/0825; H04W 74/0891; H04W 92/18
See application file for complete search history.

(56) References Cited

U.S. PATENT DOCUMENTS

| | | | | |
|---|---|---|---|---|
| 11,665,752 | B2 * | 5/2023 | Jung | H04W 24/10 370/329 |
| 2021/0315026 | A1 | 10/2021 | Jung et al. | |
| 2022/0417961 | A1 | 12/2022 | Si | |
| 2023/0007674 | A1 | 1/2023 | Si | |
| 2023/0232426 | A1 * | 7/2023 | Liu | H04B 7/0621 370/330 |
| 2023/0292348 | A1 | 9/2023 | Kim et al. | |
| 2023/0370987 | A1 * | 11/2023 | Park | H04W 16/14 |
| 2025/0056440 | A1 * | 2/2025 | Liu | H04L 5/0094 |
| 2025/0227737 | A1 * | 7/2025 | Talarico | H04L 1/1861 |
| 2025/0386367 | A1 * | 12/2025 | Guo | H04W 74/0808 |
| 2026/0046792 | A1 * | 2/2026 | Hu | H04L 5/001 |
| 2026/0107290 | A1 * | 4/2026 | Lee | H04W 72/25 |

OTHER PUBLICATIONS

3GPP TS 38.212, V17.1.0, Release 17, (Mar. 2022), “Sidelink transport channels and control information”, pp. 187-193.

* cited by examiner

METHOD AND APPARATUS FOR TRANSMITTING AND RECEIVING SIGNAL BETWEEN TERMINALS IN WIRELESS COMMUNICATION SYSTEM

CROSS-REFERENCE TO RELATED APPLICATIONS

This application claims priority to Korean Patent Applications No. 10-2023-0098333, filed on Jul. 27, 2023, and No. 10-2024-0096344, filed on Jul. 22, 2024, with the Korean Intellectual Property Office (KIPO), the entire contents of which are hereby incorporated by reference.

BACKGROUND

1. Technical Field

The present disclosure relates to a technique for transmitting and receiving unlicensed band signals between terminals in a wireless communication system, and more particularly, to a method of configuring synchronization signals transmitted and received between terminals and a technique for transmitting and receiving the synchronization signals in a wireless communication system.

2. Related Art

With the development of information and communication technology, various wireless communication technologies are being developed. Representative wireless communication technologies include long-term evolution (LTE) and new radio (NR) defined as the 3rd generation partnership project (3GPP) standards. The LTE may be one of the 4th generation (4G) wireless communication technologies, and the NR may be one of the 5th generation (5G) wireless communication technologies.

For the processing of rapidly increasing wireless data after commercialization of the 4G communication system (e.g., communication system supporting LTE), the 5G communication system (e.g., communication system supporting NR) using a frequency band (e.g., frequency band above 6 GHZ) higher than a frequency band (e.g., frequency band below 6 GHZ) of the 4G communication system as well as the frequency band of the 4G communication system is being considered. The 5G communication system can support enhanced Mobile BroadBand (eMBB), Ultra-Reliable and Low-Latency Communication (URLLC), and massive machine type communication (mMTC) scenarios.

The 5G communication system may provide a wireless communication service on a carrier or cell basis. Here, carriers or cells may be identified by different frequency bands, different frequencies within the same band, geographical locations, cell indexes/cell IDs, and/or the like managed by a base station. The base station may configure and manage one or more carriers or cells. A terminal may perform wireless communication using one or more carriers or cells configured by a connected base station. The terminal can receive or transmit data (e.g. physical downlink shared channel (PDSCH) for downlink and/or physical uplink shared channel (PUSCH) for uplink) using downlink and/or uplink resources. Information on the resources for receiving or transmitting data is included in downlink control information (DCI) transmitted on a physical downlink control channel (PDCCH) by the base station. The terminal can monitor PDCCHs and identify DCI to be received through blind decoding (BD) to obtain control information. In addition, data can be transmitted or received between terminals through a sidelink (SL). Channels configured to transmit information or data, or to transmit reception response signals through the sidelink may include a physical sidelink broadcast channel (PSBCH), physical sidelink shared channel (PSSCH), physical sidelink control channel (PSCCH), and physical sidelink feedback channel (PSFCH).

When the sidelink is configured in an unlicensed band, the terminal needs to satisfy conditions for using an unlicensed frequency in order to transmit at least one of the channels mentioned above. These conditions may include a function of checking a channel occupancy status before transmitting a signal. If a result of checking the channel occupancy status indicates that other signals are occupying a radio resource, the terminal may not be able to perform signal transmission. Therefore, even if the radio resource has been scheduled to the terminal, has been determined according to a designated procedure, or has been defined under specified conditions, the terminal should cancel the signal transmission using the radio resource if the channel is determined to be occupied. Consequently, methods for adding, controlling, and managing transmission times or transmission occasions based on the result of checking the channel occupancy status are required. In addition, it is necessary to define the configuration of transmission resources for the additional transmission occasions. Furthermore, the configuration of bandwidth and subchannels that vary based on the result of checking the channel occupancy status needs to be defined when configuring resources in the frequency domain.

SUMMARY

The present disclosure aims to resolve the above-described needs by providing methods for configuring transmission resources considering technical criteria such as channel occupancy and occupied bandwidth in an unlicensed band, and for scheduling these transmission resources.

A method according to a first exemplary embodiment of the present disclosure for achieving the above-described objection, as a method of a first terminal, may comprise: receiving a higher layer message including basic sidelink synchronization signal block (S-SSB) information on a basic S-SSB transmitted in an unlicensed band; obtaining a channel occupancy time (COT) through a listen-before-talk (LBT) procedure in the unlicensed band; and transmitting COT information including additional S-SSB configuration information to other terminals, wherein the basic S-SSB information includes information on a transmission occasion of the basic S-SSB and information on a frequency of the basic S-SSB, and the additional S-SSB configuration information includes information for transmission of an additional S-SSB that is transmitted in addition to the basic S-SSB within the COT.

The additional S-SSB configuration information may include information on a number of additional S-SSBs to be additionally transmitted in time domain within the COT and information on a time offset of the additional S-SSBs from the basic S-SSB.

The method may further comprise: generating indication information instructing to transmit the additional S-SSB in at least one slot of additional S-SSB transmission slots based on the additional S-SSB configuration information; and transmitting the indication information to a second terminal.

The additional S-SSB configuration information may include information on a number of additional S-SSBs to be additionally transmitted in frequency domain and information on a frequency offset of the additional S-SSBs from the basic S-SSB.

The additional S-SSB configuration information is configured, such that an additional S-SSB having at least one physical resource block (PRB) overlapping in frequency with the basic S-SSB is excluded from transmission.

The COT information may further indicate slot configuration information of the COT, and whether to extend a cyclic prefix (CP) of a signal transmitted in a slot immediately after a transmission occasion of an additional S-SSB.

The LBT procedure may be one of a random back-off LBT procedure with a random back-off procedure, a first type LBT procedure using a preset first time value, or a second type LBT procedure using a second time value longer than the first time value.

The random back-off LBT procedure, the first type LBT procedure, or the second type LBT procedure may be determined based on priority class information of data to be transmitted by the first terminal.

The COT information may include a start time of channel occupancy (CO), and the COT information may further include either a time length of the CO or an end time of the CO.

A first terminal according to an exemplary embodiment of the present disclosure may comprise at least one processor, and the at least one processor may causes the first terminal to perform: receiving a higher layer message including basic sidelink synchronization signal block (S-SSB) information on a basic S-SSB transmitted in an unlicensed band; obtaining a channel occupancy time (COT) through a listen-before-talk (LBT) procedure in the unlicensed band; and transmitting COT information including additional S-SSB configuration information to other terminals, wherein the basic S-SSB information includes information on a transmission occasion of the basic S-SSB and information on a frequency of the basic S-SSB, and the additional S-SSB configuration information includes information for transmission of an additional S-SSB that is transmitted in addition to the basic S-SSB within the COT.

The additional S-SSB configuration information may include information on a number of additional S-SSBs to be additionally transmitted in time domain within the COT and information on a time offset of the additional S-SSBs from the basic S-SSB.

The at least one processor may further cause the first terminal to perform: generating indication information instructing to transmit the additional S-SSB in at least one slot of additional S-SSB transmission slots based on the additional S-SSB configuration information; and transmitting the indication information to a second terminal.

The additional S-SSB configuration information may include information on a number of additional S-SSBs to be additionally transmitted in frequency domain and information on a frequency offset of the additional S-SSBs from the basic S-SSB.

The additional S-SSB configuration information may be configured, such that an additional S-SSB having at least one physical resource block (PRB) overlapping in frequency with the basic S-SSB is excluded from transmission.

The COT information may further indicate slot configuration information of the COT, and whether to extend a cyclic prefix (CP) of a signal transmitted in a slot immediately after a transmission occasion of an additional S-SSB.

The LBT procedure may be one of a random back-off LBT procedure with a random back-off procedure, a first type LBT procedure using a preset first time value, or a second type LBT procedure using a second time value longer than the first time value.

The random back-off LBT procedure, the first type LBT procedure, or the second type LBT procedure may be determined based on priority class information of data to be transmitted by the first terminal.

The COT information may include a start time of channel occupancy (CO), and the COT information may further include either a time length of the CO or an end time of the CO.

A method of a first terminal, according to an exemplary embodiment of the present disclosure, may comprise: receiving a higher layer message including basic sidelink synchronization signal block (S-SSB) information on a basic S-SSB transmitted in an unlicensed band; receiving channel occupancy time (COT) information including additional S-SSB configuration information; and receiving an additional S-SSB based on the additional S-SSB configuration information, wherein the basic S-SSB information includes information on a transmission occasion of the basic S-SSB and information on a frequency of the basic S-SSB, and the additional S-SSB configuration information includes information for reception of the additional S-SSB that is transmitted in addition to the basic S-SSB within a COT indicated by the COT information.

The additional S-SSB configuration information may include at least one of time-domain configuration information or frequency-domain configuration information, the time-domain configuration information may include a number of additional S-SSBs to be additionally transmitted in time domain within the COT and information on a time offset of the additional S-SSBs from the basic S-SSB, and the frequency-domain configuration information may include information on a number of additional S-SSBs to be additionally transmitted in frequency domain and information on a frequency offset of the additional S-SSBs from the basic S-SSB.

According to exemplary embodiments of the present disclosure, methods and apparatuses are provided for acquiring synchronization between wireless devices when transmitting signals/channels using an unlicensed frequency band. Specifically, by enabling the transmission and/or reception of additional synchronization signals considering the mobility of wireless devices in the unlicensed band, the devices can maintain synchronization. Furthermore, there is an advantage in more effectively obtaining a channel occupancy time (COT) by performing listen-before-talk (LBT) procedures in various manners based on priority class information of data transmitted in the unlicensed band. Additionally, there is an advantage in securely ensuring a COT through transmission of additional synchronization signals to prevent channel occupancy by other devices during a period of the COT.

DETAILED DESCRIPTION OF THE EMBODIMENTS

Figure 1:
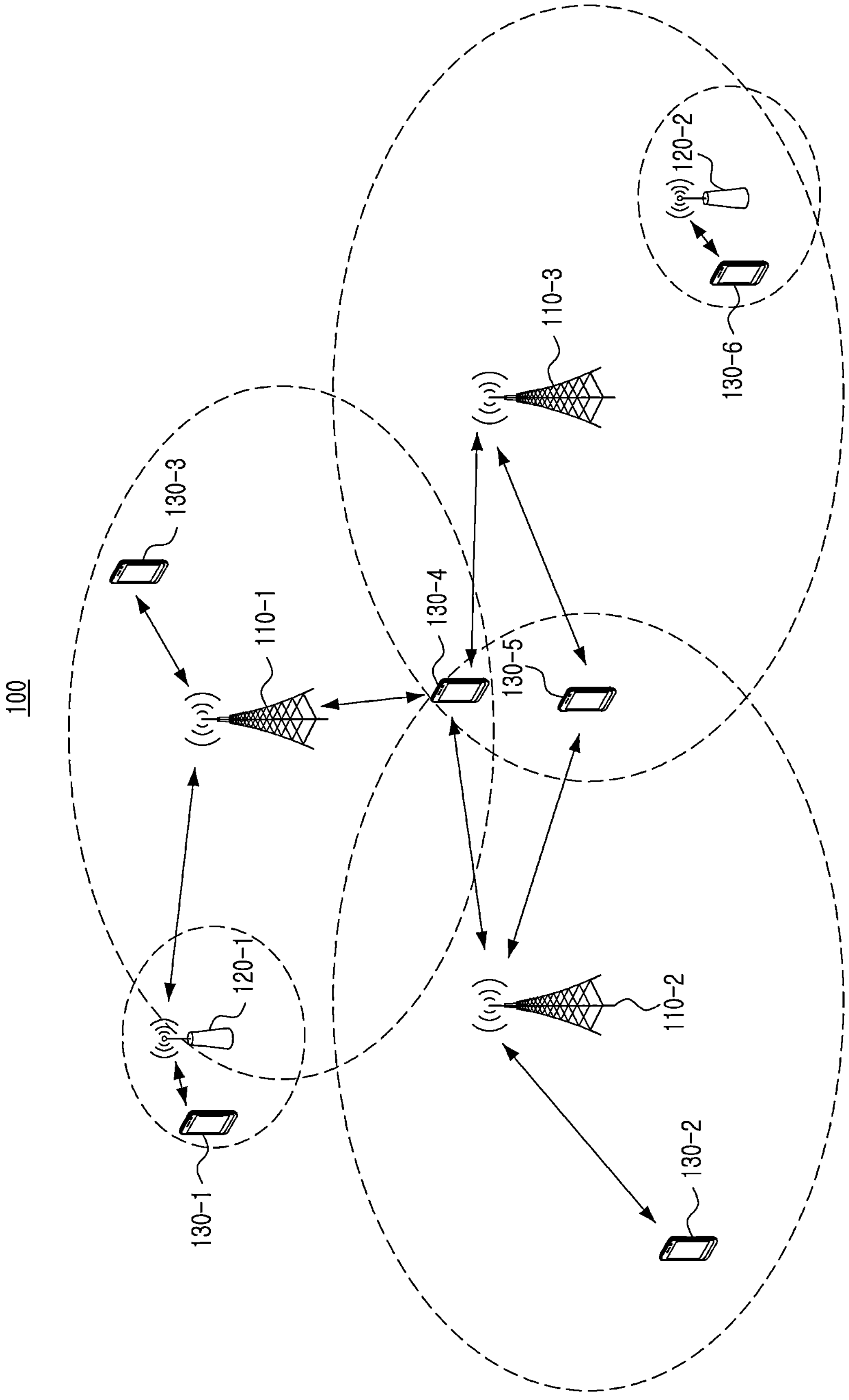
FIG. 1 is a conceptual diagram illustrating an exemplary embodiment of a communication system.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, beyond 5G (B5G) mobile communication network (e.g. 6G mobile communication network), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4G communication (e.g. long term evolution (LTE), LTE-advanced (LTE-A)), 5G communication (e.g. new radio (NR)), 6G communication, etc. specified in the 3rd generation partnership project (3GPP) standards. The 4G communication may be performed in frequency bands below 6 GHz, and the 5G and 6G communication may be performed in frequency bands above 6 GHz as well as frequency bands below 6 GHz.

For example, in order to perform the 4G communication, 5G communication, and 6G communication, the plurality of communication may support a code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform spread OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter bank multi-carrier (FBMC) based communication protocol, universal filtered multi-carrier (UFMC) based communication protocol, space division multiple access (SDMA) based communication protocol, orthogonal time-frequency space (OTFS) based communication protocol, or the like.

Further, the communication system 100 may further include a core network. When the communication 100 supports 4G communication, the core network may include a serving gateway (S-GW), packet data network (PDN) gateway (P-GW), mobility management entity (MME), and the like. When the communication system 100 supports 5G communication or 6G communication, the core network may include a user plane function (UPF), session management function (SMF), access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
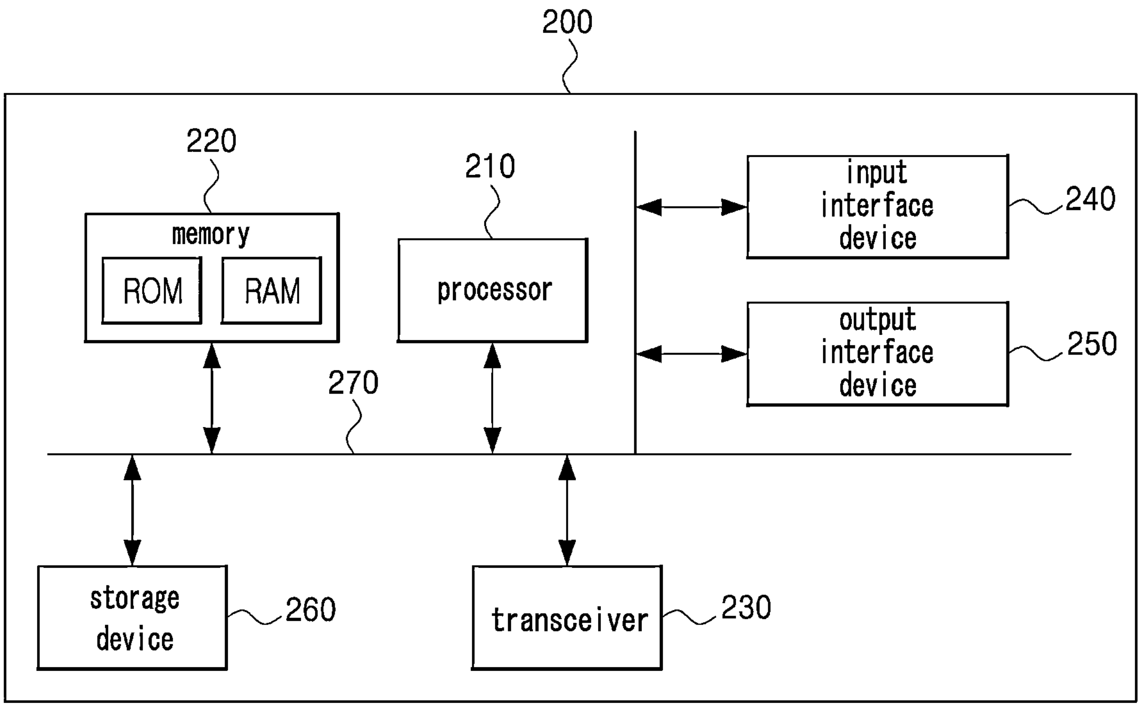
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B (NB), evolved Node-B (eNB), gNB, base transceiver station (BTS), radio base station, radio transceiver, access point, access node, road side unit (RSU), radio remote head (RRH), transmission point (TP), transmission and reception point (TRP), or the like.

Each of the plurality of terminals 130-1, 130-2, 130-3, 130-4, 130-5, and 130-6 may refer to a user equipment (UE), terminal, access terminal, mobile terminal, station, subscriber station, mobile station, portable subscriber station, node, device, Internet of Thing (IoT) device, mounted module/device/terminal, on-board device/terminal, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g. a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the COMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for configuring and managing radio interfaces in a communication system will be described. Even when a method (e.g. transmission or reception of a signal) performed at a first communication node among communication nodes is described, the corresponding second communication node may perform a method (e.g. reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g. remote radio transmission/reception function, baseband processing function, and the like) of a communication protocol. Alternatively, the remote radio transmission/reception function among all the functions of the communication protocol may be performed by a transmission and reception point (TRP) (e.g. flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

Figure 3:
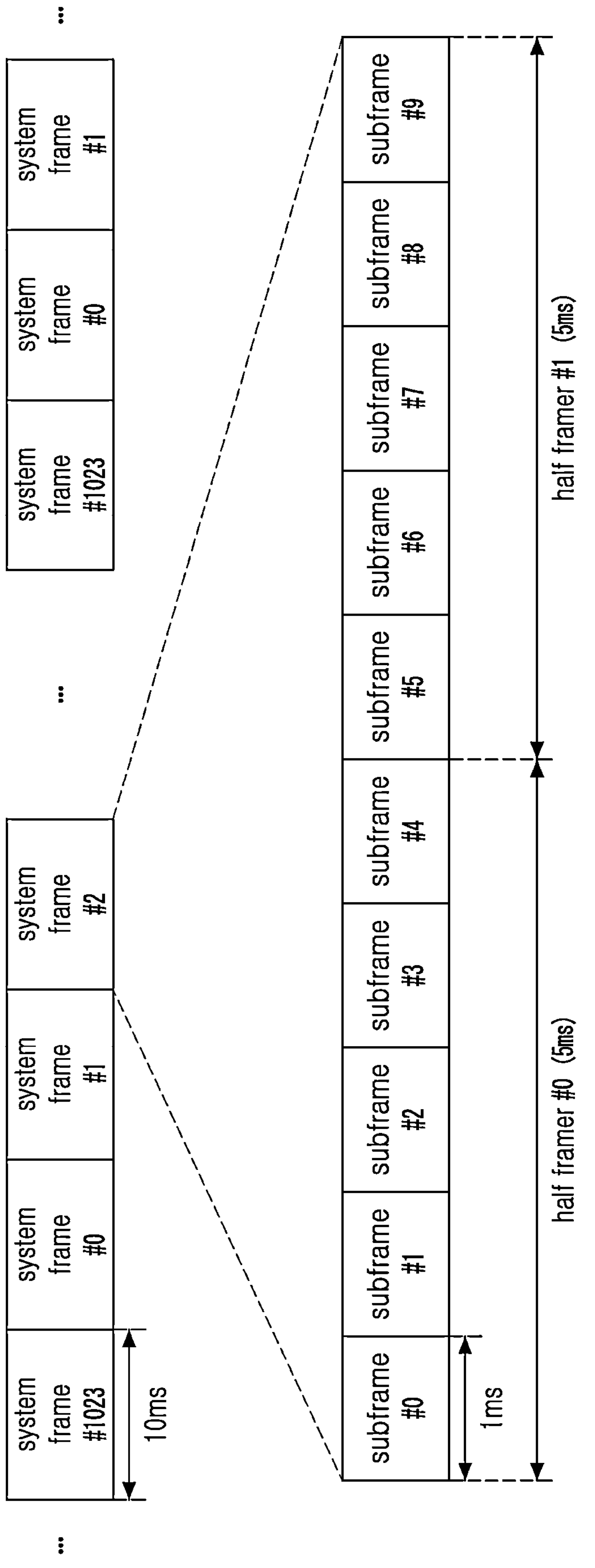
FIG. 3 is a conceptual diagram illustrating a first exemplary embodiment of a system frame in a wireless communication network.

FIG. 3 is a conceptual diagram illustrating a first exemplary embodiment of a system frame in a wireless communication network.

Referring to FIG. 3, time resources in the wireless communication network may be divided on a frame basis. For example, system frames of the wireless communication network may be configured continuously in the time domain. The length of the system frame may be 10 millisecond (ms). A system frame number (SFN) may be set to one of #0 to #1023. In this case, 1024 system frames may be repeated on the time axis of the wireless communication network. For example, an SFN of a system frame after the system frame #1023 may be #0.

One system frame may include two half frames. The length of one half frame may be 5 ms. A half frame located at a starting region of the system frame may be referred to as 'half frame #0', and a half frame located at an ending region of the system frame may be referred to as 'half frame #1'. One system frame may include 10 subframes. The length of one subframe may be 1 ms. 10 subframes within one system frame may be referred to as subframes #0-#9.

Figure 4:
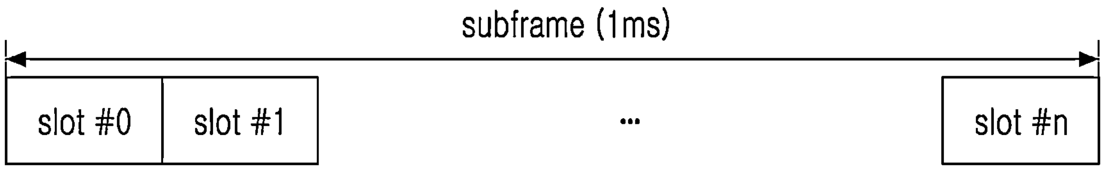
FIG. 4 is a conceptual diagram illustrating a first exemplary embodiment of a subframe in a wireless communication network.

FIG. 4 is a conceptual diagram illustrating a first exemplary embodiment of a subframe in a wireless communication network.

Referring to FIG. 4, one subframe may include n slots, and n may be a natural number. Accordingly, one subframe may consist of one or more slots.

Figure 5:
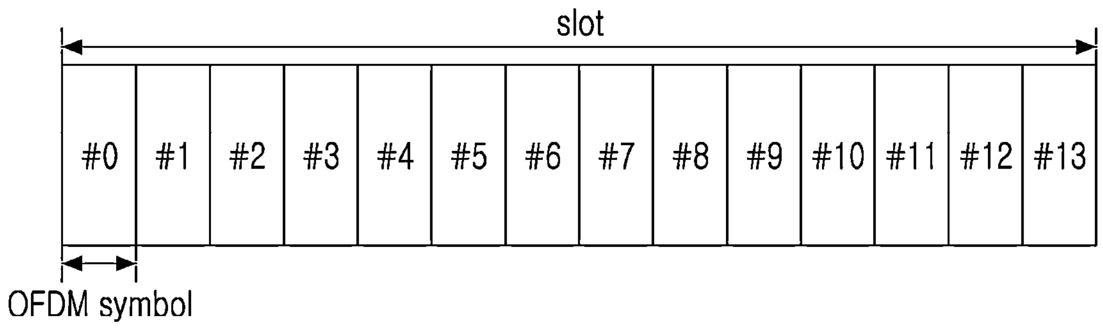
FIG. 5 is a conceptual diagram illustrating a first exemplary embodiment of a slot in a wireless communication network.
Figure 6:
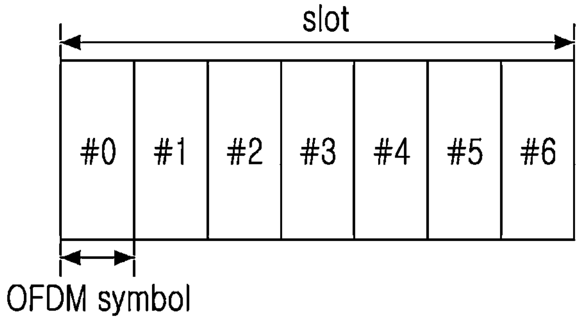
FIG. 6 is a conceptual diagram illustrating a second exemplary embodiment of a slot in a wireless communication network.

FIG. 5 is a conceptual diagram illustrating a first exemplary embodiment of a slot in a wireless communication network, and FIG. 6 is a conceptual diagram illustrating a second exemplary embodiment of a slot in a wireless communication network.

Referring to FIGS. 5 and 6, one slot may include one or more symbols. One slot shown in FIG. 5 may include 14 symbols. One slot shown in FIG. 6 may include 7 symbols. The length of slot may vary according to the number of symbols included in a slot and the length of symbol. Alternatively, the length of slot may vary according to a numerology. When a subcarrier spacing is 15 kHz (e.g., $\mu$=0), the length of slot may be 1 ms. In this case, one system frame may include 10 slots. When a subcarrier spacing is 30 kHz (e.g., $\mu$=1), the length of slot may be 0.5 ms. In this case, one system frame may include 20 slots.

When a subcarrier spacing is 60 kHz (e.g., $\mu$=2), the length of slot may be 0.25 ms. In this case, one system frame may include 40 slots. When a subcarrier spacing is 120 kHz (e.g., $\mu$=3), the length of slot may be 0.125 ms. In this case, one system frame may include 80 slots. When a subcarrier spacing is 240 kHz (e.g., $\mu$=4), the length of slot may be 0.0625 ms. In this case, one system frame may include 160 slots.

The symbol may be configured as a downlink (DL) symbol, flexible (FL) symbol, or uplink (UL) symbol. A slot composed of only DL symbols may be referred to as a 'DL slot', a slot composed of only FL symbols may be referred to as a ‘FL slot’, and a slot composed of only UL symbols may be referred to as a ‘UL slot’.

Figure 7:
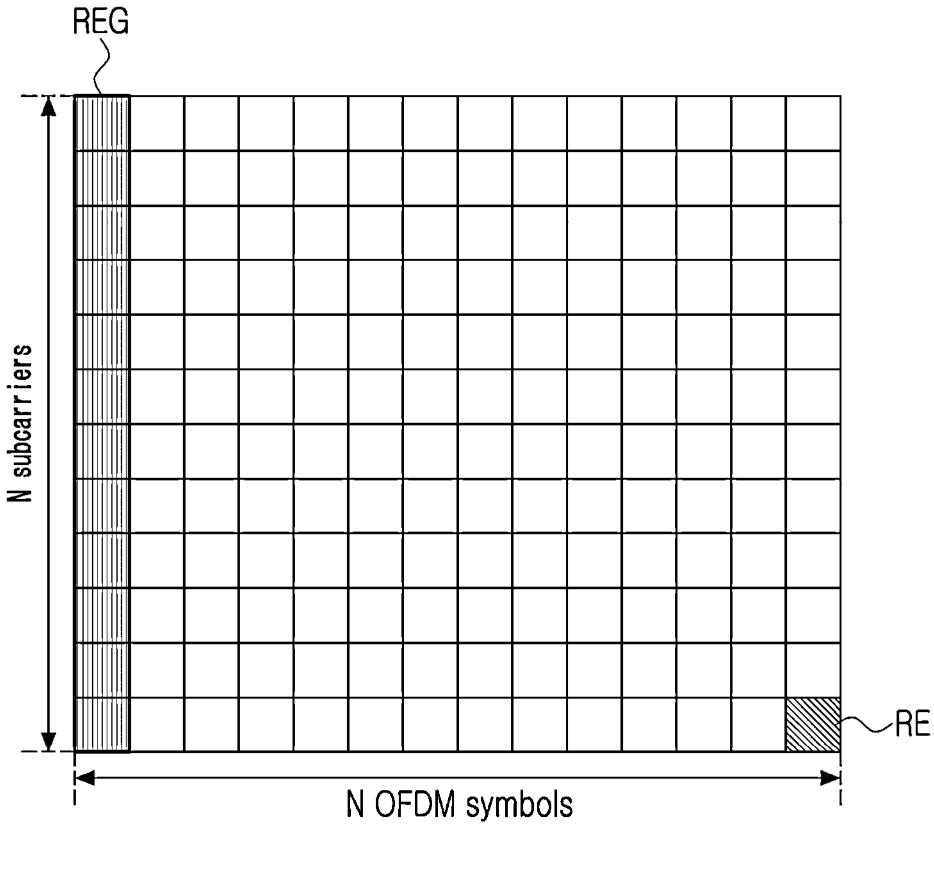
FIG. 7 is a conceptual diagram illustrating a first exemplary embodiment of a time-frequency resource in a wireless communication network.

FIG. 7 is a conceptual diagram illustrating a first exemplary embodiment of a time-frequency resource in a wireless communication network.

Referring to FIG. 7, a resource composed of one OFDM symbol on the time axis and one subcarrier on the frequency axis may be defined as a ‘resource element (RE)’. A resource composed of one OFDM symbol on the time axis and K subcarriers on the frequency axis may be defined as a ‘resource element group (REG)’. The REG may include K REs. The REG may be used as a basic unit of resource allocation in the frequency domain. K may be a natural number. For example, K may be 12. N may be a natural number. In the slot shown in FIG. 5, N may be 14, and in the slot shown in FIG. 6, N may be 7. N OFDM symbols may be used as a basic unit of resource allocation in the time domain.

Hereinafter, methods for transmitting and receiving data in a wireless communication network will be described. In downlink communication, downlink data may be transmitted through a PDSCH. In uplink communication, uplink data may be transmitted through a PUSCH. In the following exemplary embodiments, a PDSCH may mean downlink data. The base station may transmit downlink control information (DCI) including configuration information of a PDSCH through a PDCCH. In the following exemplary embodiments, a PDCCH may refer to DCI (e.g., control information). The terminal may receive the DCI through the PDCCH and may identify the configuration information of the PDSCH included in the DCI. For example, the configuration information of the PDSCH may include information indicating a PDSCH region in the time domain, information indicating the PDSCH region in the frequency domain, and/or a modulation and coding scheme (MCS) applied thereto.

Hereinafter, sidelink transmission and reception methods in the present disclosure will be described.

First, resources used for signal/channel transmission in the sidelink will be described. The sidelink resources that a terminal can use to transmit or receive signals and/or data may be defined as a sidelink resource pool. As the sidelink resource pool, a transmission resource pool and a reception resource pool may be independently configured for a specific sidelink terminal. The resource pool may be composed of one or more subchannels and one or more slots. Here, a subchannel may be composed of N_PRB physical resource blocks (PRBs). N_PRB may be set to one of 10, 12, 15, 20, 25, 50, 75, or 100. Slots of the resource pool may be defined with a periodicity of 10240 ms. Among all slots within a period of 10240 ms, only some slots may be configured as the sidelink resource pool. Slots that cannot be configured as the resource pool may include slots that include symbol(s) configured for downlink by time division duplexing (TDD) configuration. When configuring the resource pool, slots where sidelink synchronization signal block (S-SSB) can be configured may be excluded from the resource pool configuration. Slots that can be configured as the sidelink resource pool, excluding those that cannot be configured, may be defined by a bitmap.

Hereinafter, sidelink channels will be described. The sidelink channel may be defined as a means to transmit traffic and data related to sidelink services or to convey control information related to sidelink management and scheduling. The sidelink channels may include a physical sidelink broadcast channel (PSBCH), physical sidelink shared channel (PSSCH), physical sidelink control channel (PSCCH), and physical sidelink feedback channel (PSFCH). The PSCCH may be a channel for transmitting sidelink control information (SCI). The PSSCH may be a channel for transmitting a transport block, data, or traffic of the sidelink. The PSFCH may be a channel for providing feedback on a reception status of the PSSCH, indicating either ACK or NACK. In sidelink communication, time synchronization with a neighboring terminal may be acquired using a sidelink primary sidelink synchronization signal (S-PSS) or a sidelink secondary synchronization signal (S-SSS). A sidelink synchronization signal block (S-SSB) may be configured to include one or more of the PSBCH, S-PSS, or S-SSS.

Figure 8A:
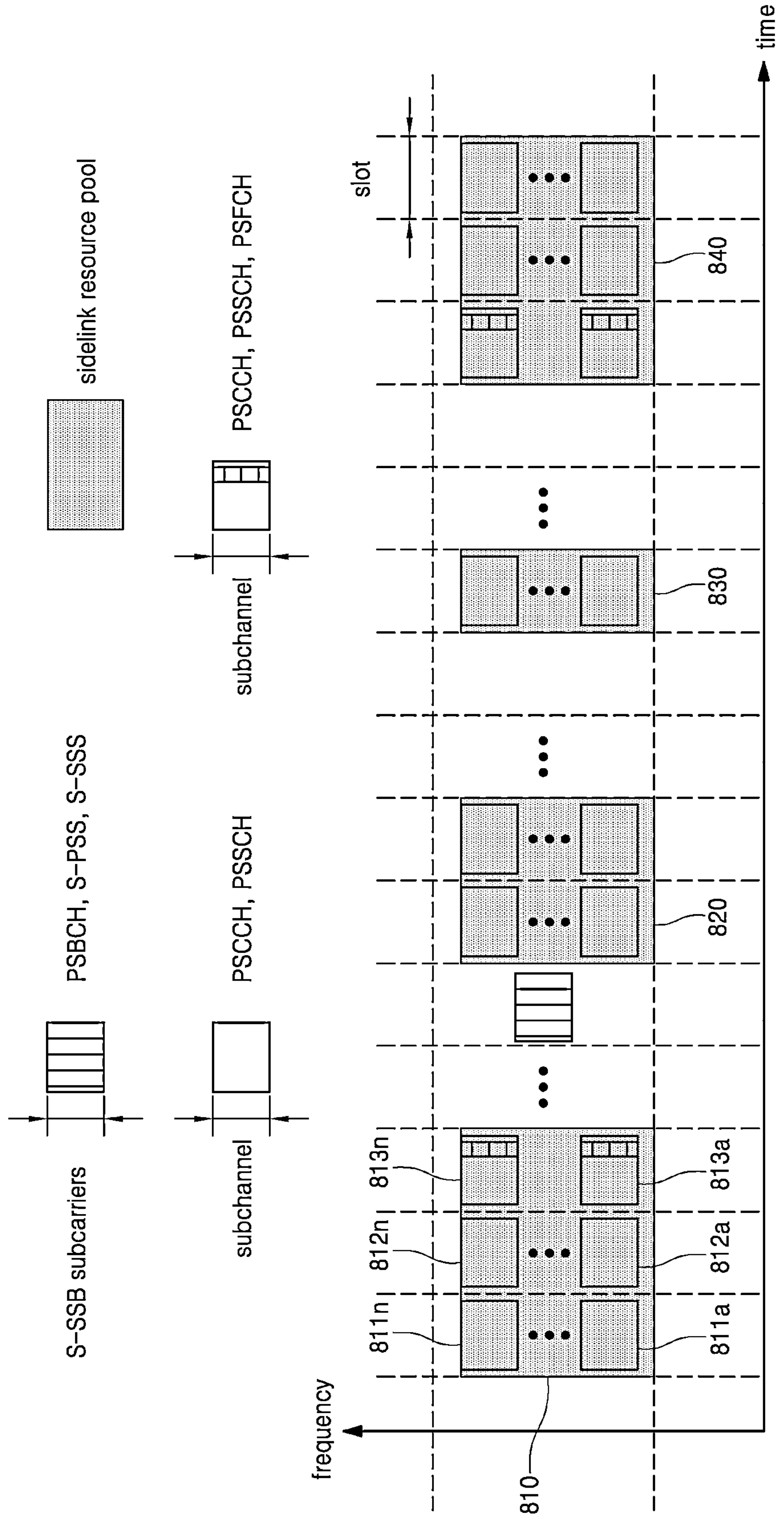
FIG. 8A is a conceptual diagram illustrating an exemplary embodiment of sidelink resource pool configuration and sidelink channels.

FIG. 8A is a conceptual diagram illustrating an exemplary embodiment of sidelink resource pool configuration and sidelink channels.

Referring to FIG. 8A, sidelink resource pools 810, 820, 830, and 840 are illustrated across all resources in the time domain and frequency domain. As described above, each of the sidelink resource pools 810, 820, 830, and 840 may be defined as a set of sidelink resources through which the terminal can transmit or receive signals and/or data.

Describing the first sidelink resource pool 810 in more detail, a plurality of transmission blocks 811*a*, . . . , and 811*n* may be transmitted in the first slot of the first sidelink resource pool 810, a plurality of transmission blocks 812*a*, . . . , and 812*n* may be transmitted in the second slot of the first sidelink resource pool 810, and a plurality of transmission blocks 813*a*, . . . , and 813*n* may be transmitted in the third slot of the first sidelink resource pool 810. In the present disclosure, one transmission block may be composed of OFDM symbols transmitted through one subchannel during one slot. In the present disclosure, a ‘transmission block’ may refer to a basic resource unit used in sidelink communication. As a basic unit used in sidelink communication, it may also be referred to as a ‘sidelink transmission block’. One transmission block may be composed of a PSCCH and PSSCH, or may be composed of a PSCCH, PSSCH, and PSFCH. FIG. 8A illustrates a case where each of the transmission blocks transmitted in the first and second slots of the first sidelink resource pool 810 is composed of a PSCCH and PSSCH, and each of the transmission blocks transmitted in the third slot is composed of a PSCCH, PSSCH, and PSFCH.

The second sidelink resource pool 820 is an example composed of only transmission blocks each of which transmits a PSCCH and/or PSSCH through one subchannel in two slots, and the third sidelink resource pool 830 is an example composed of only transmission blocks each of which transmits a PSCCH and PSSCH through one subchannel in one slot. The fourth sidelink resource pool 840 is an example where the first slot of three slots consists of transmission blocks, each composed of a PSCCH, PSSCH, and PSFCH, and the second slot and third slot of the three slots consist of transmission blocks, each composed of a PSCCH and PSSCH.

FIG. 8A illustrates the slots of the sidelink resource pool, excluding those that do not meet the resource pool configuration conditions or are not indicated by a bitmap. Therefore, the sidelink resource pool may not include physically consecutive slots. However, even though the sidelink resource pool does not include physically consecutive slots, slot indexes may be assigned consecutively within the sidelink resource pool.

Unless otherwise specified in the present disclosure, a sidelink transmission resource may refer to a resource within the sidelink resource pool. The sidelink transmission resource may refer to resource(s) for configuring a sidelink channel and allowing a terminal to transmit the sidelink channel. In addition, in expressions such as 'transmits a signal' or 'receives a signal' in the present disclosure, the signal may mean one or more of the aforementioned sidelink channels. Accordingly, in the following description, 'signal' may refer to one or more sidelink channels.

[Sidelink Transmission Resource/Transmission Unit]

Figure 8B:
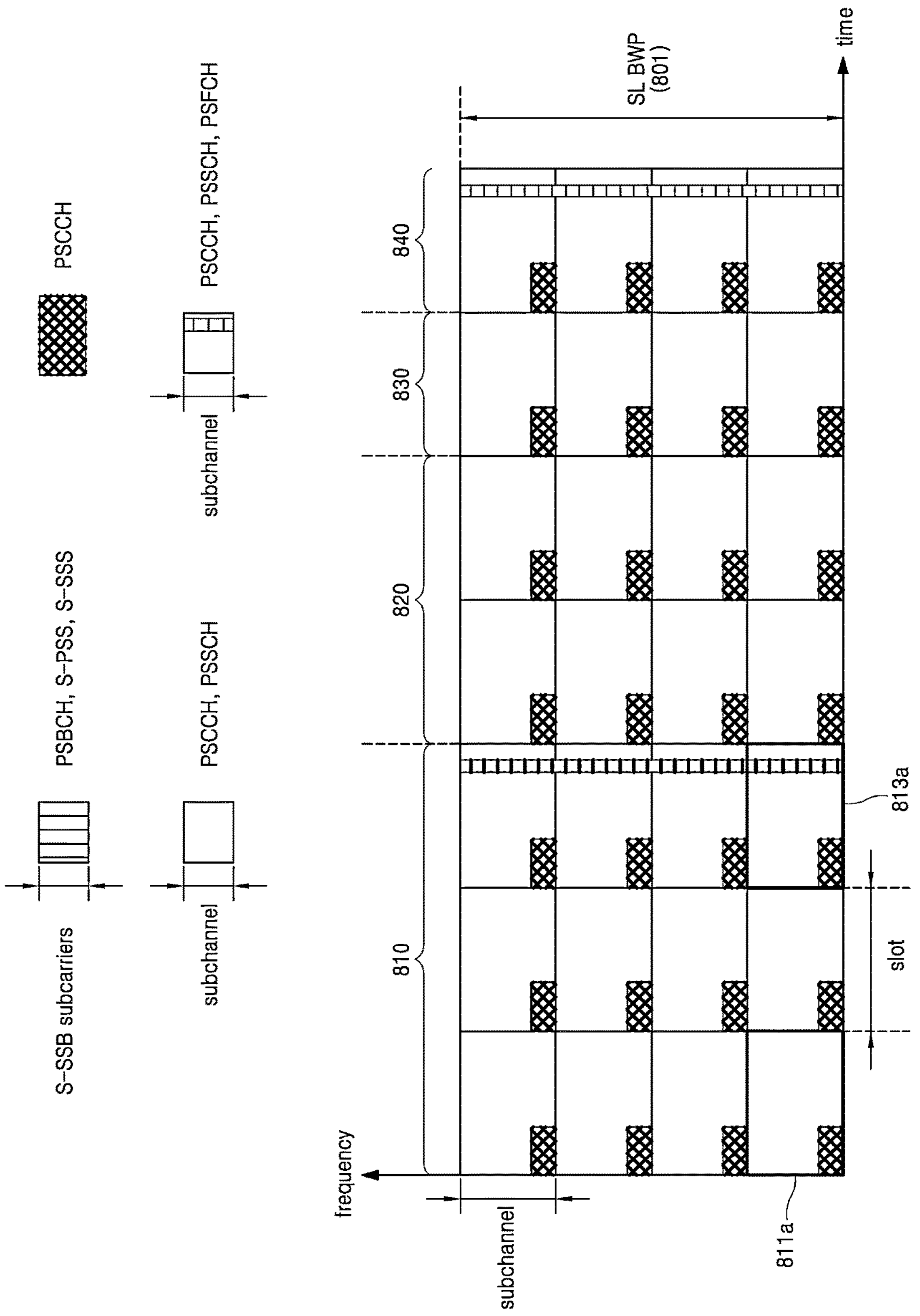
FIG. 8B is a conceptual diagram illustrating an exemplary embodiment of sidelink transmission resources.

FIG. 8B is a conceptual diagram illustrating an exemplary embodiment of sidelink transmission resources.

FIG. 8B illustrates an exemplary embodiment based on the sidelink resource pool configuration in FIG. 8A. Referring to FIG. 8B, the sidelink resource pools 810, 820, 830, and 840 are depicted in a continuous form in both the time domain and frequency domain. This may correspond to a case where the physical configuration of the sidelink resource pool described in FIG. 8A is re-expressed in a logical form.

In addition, in the example of FIG. 8B, the sidelink resource pools 810, 820, 830, and 840 are an example corresponding to a case where a sidelink (SL) bandwidth part (BWP) 801 is composed of four subchannels. FIG. 8B illustrates the case where the SL BWP 801 is composed of four subchannels to facilitate understanding in describing the present disclosure. In other words, the SL BWP 801 is not limited to four subchannels, and may be configured with three or less or five or more subchannels.

The first sidelink resource pool 810 may be composed of three consecutive slots, as previously described in FIG. 8A. The second sidelink resource pool 820 may be composed of two consecutive slots, the third sidelink resource pool 830 may be composed of one slot, and the last fourth sidelink resource pool 840 may be composed of three consecutive slots. In FIG. 8B, only the first slot among the three consecutive slots of the fourth sidelink resource pool 840 is illustrated.

As previously described, since FIG. 8B is a logical form of the sidelink resource pools 810 to 840, the respective slots may be physically mapped as previously illustrated in FIG. 8A.

In addition, each transmission block included in the sidelink resource pools 810 to 840 may be composed of a PSCCH resource and PSSCH resource, or may be composed of a PSCCH resource, PSSCH resource, and PSFCH resource. A resource unit composed of a PSCCH resource and PSSCH resource will be described with reference to the first transmission block 811*a* in the first slot of the first sidelink resource pool 810. In the first transmission block 811*a* included in the first slot of the first sidelink resource pool 810, a PSCCH may be located in a predefined region, and the remaining region of the first transmission block 811*a*, excluding the predefined region for the PSCCH, may be configured as a resource for transmitting a PSSCH.

Here, the PSCCH may be configured starting from a PRB with the lowest index in a subchannel with the lowest index among subchannel(s) configured for PSSCH transmission. The number of OFDM symbols used to configure the PSCCH may be 2 or 3, and a start position of the PSCCH may be defined as an index of 'SL-start symbol+1'. The SL-start symbol may be configured, for example, as sl-StartSymbol. FIG. 8B illustrates a case where the PSCCH is configured starting from a PRB with the lowest index in a subchannel with the lowest index of each transmission block.

FIG. 8B illustrates a case where the first transmission block 813*a* included in the third slot of the first sidelink resource pool 810 is composed of a PSCCH resource, PSSCH resource, and PSFCH resource. As described above, a PSCCH may be located in a predefined region within one transmission block. In addition, a PSFCH may also be located in a predefined region within the remaining region, excluding the region where the PSCCH is located. The transmission blocks, each composed of a PSCCH resource, PSSCH resource, and PSFCH resource, may be configured as shown in the first transmission block 813*a* included in the third slot of the first sidelink resource pool 810 illustrated in FIG. 8B.

A position of a slot in which a PSFCH can be arranged may be predefined, and a configuration condition thereof and/or whether or not it is transmitted may be defined differently in licensed and unlicensed bands.

Physical position or resource configuration information of a time-frequency region in which sidelink channel(s) are actually configured and transmitted within the sidelink transmission resource (e.g. SL BWP 801) may be defined by a radio resource control (RRC) message and/or sidelink control information (SCI). For example, OFDM symbols that can be used for signal transmission within one slot may be defined according to the parameter sl-StartSymbol, which indicates the SL-start symbol, and a parameter sl-LengthSymbols, which indicates the length of the symbols, both of which are included in the RRC message.

As described above, SL communication may be classified into SL communication in a licensed band and SL communication in an unlicensed band. A length of a slot of a transmission block for SL communication in an unlicensed band may be set to be shorter than a length of a slot used for SL communication in a licensed band. For example, if the length of the slot used for SL communication in a licensed band serves as a reference length, a sub-slot with a length shorter than the reference length may be defined, and the transmission block in an unlicensed band may be configured based on this sub-slot length. Therefore, when the length of one slot in an unlicensed band is determined as the sub-slot length, the number of OFDM symbols included in the sub-slot of an unlicensed band may be less than the number of OFDM symbols included in the slot of a licensed band. Based on this, the length of the sub-slot in an unlicensed band may be defined as the number of OFDM symbols. Therefore, the parameter sl-LengthSymbols included in the RRC message may have a value of the sub-slot length or the number of OFDM symbols.

As another example, the slot length of the transmission block transmitted in an unlicensed band may be indicated by a specific parameter of SCI.

A sidelink subchannel may be composed of a predetermined number of contiguous physical resource blocks (PRB(s)). In this case, the number of the PRB(s) may be defined (or determined) by the base station. Information on the number of the PRB(s) defined by the base station may be configured by a parameter N_PRB4subchannel included in an RRC message and provided to the terminal. In addition, the sidelink subchannels may be configured contiguously within the resource pool.

Alternatively, in SL communication in an unlicensed band, a subchannel may be configured as a set of physically distributed PRBs. When a subchannel is configured as a set of physically distributed PRBs, the PRBs may be arranged at predetermined intervals. In the present disclosure, the subchannel structure having a set of PRBs at predetermined intervals may be defined as an 'interlace subchannel'.

The base station may schedule an SL resource for SL communication or configure an SL resource and transmit scheduling information or configuration information thereof to the terminal. Therefore, the terminal may receive the scheduling information or configuration information from the base station. The terminal may determine a resource for configuring an SL channel based on the scheduling information or configuration information of the base station. When determining a resource for configuring an SL channel, the terminal may determine an SL channel resource according to a predefined resource selection procedure.

The terminal may determine a transmission resource based on determination of the channel resource and determination of slot(s). The transmission resource may be configured with one or more subchannel(s) and the slot(s). If the transmission resource is configured with one subchannel and one slot, it may correspond to one transmission block previously described in FIGS. 8A and 8B. If the transmission resource is configured with two or more subchannels and one slot, two or more different transmission blocks in the frequency domain within the same slot, which are described above in FIGS. 8A and 8B, may be the transmission resource. If the transmission resource is configured with one subchannel and two or more slots, two or more different transmission blocks corresponding to one subchannel in the two or more slots, which are described above in FIGS. 8A and 8B, may be the transmission resource.

An SL transmitting terminal may transmit (or broadcast) SCI including information on a position of a PSSCH transmission resource to a receiving terminal. The information on the position of the PSSCH transmission resource may be, for example, information on subchannel(s) and/or slot(s). As an example, the information on the position of the PSSCH transmission resource, which is included in the SCI, may be defined by information on subchannel(s) in a slot in which the SCI is transmitted. As another example, the information on the position of the PSSCH transmission resource, which is included in the SCI, may be defined by information on subchannel(s) in a specific slot after the slot in which the SCI is transmitted, rather than the slot in which the SCI is transmitted.

Meanwhile, when the terminal performs SL communication in an unlicensed band, the terminal may perform a listen-before-talk (LBT) procedure to coexist with other wireless communication devices. Therefore, an actual transmission resource may be determined depending on a result of the LBT procedure.

The terminal that has performed the LBT procedure may use a channel for a certain time period, for example, a channel occupancy time (COT). In addition, a terminal that has not performed an LBT procedure may also be able to transmit a signal during the COT configured by the terminal that has performed the LBT procedure, according to predetermined conditions. Operations in the COT will be described in more detail in a section 'COT and COT sharing' described below.

In addition, configuration of OFDM symbol(s) of a transmission block may vary within the COT. The transmitting terminal that has performed the LBT procedure may transmit information on the configuration of OFDM symbol(s) of a transmission block within the COT to the receiving terminal by including it in SCI.

[LBT]

Hereinafter, the present disclosure will describe operations, procedures, and control information related to channel occupancy when the sidelink is configured in an unlicensed band.

In the present disclosure, an operating channel may mean a radio, spectrum, frequency, or carrier resource with a bandwidth of a predetermined size. Time-frequency resources (e.g. time-carrier frequency) in an unlicensed band may be occupied by a communication node belonging to a network (e.g. wireless local area network (WLAN)) other than a cellular network (e.g. 4G network, 5G network). Time-frequency resources in an unlicensed band may be occupied by signals transmitted and received between a base station and a terminal belonging to a cellular network. Time-frequency resources in an unlicensed band may be occupied by signals transmitted and received between terminals.

Since the present disclosure describes SL communication in an unlicensed band, a wireless device that transmits a signal/channel in the present disclosure will be referred to as 'transmitter', and a wireless device that receives a signal/channel in the present disclosure will be referred to as 'receiver'. Therefore, the wireless device may include a base station capable of supporting cellular communication and SL communication in an unlicensed band, a terminal capable of supporting cellular communication and SL communication in an unlicensed band, or the like. In addition, the wireless device may include all types of terminals, access points (APs), etc. that support only SL communication in an unlicensed band.

In an unlicensed band, unlike a licensed band, wireless devices that support cellular communication and wireless devices that do not support cellular communication share an operating channel. Therefore, a wireless device wishing to communicate in an unlicensed band needs to perform an LBT procedure to minimize mutual interference. The LBT procedure includes an operation of checking whether another wireless device occupies the operating channel before transmitting a signal/channel. The fact that the operating channel is occupied by another wireless device may mean that the another wireless device is transmitting a signal/channel in the unlicensed band, or transmission thereof is reserved. Hereinafter, for convenience of description, the LBT procedure will be referred to as 'LBT'.

In the LBT, before occupying an operating channel and transmitting a signal, a wireless device that wishes to occupy the operating channel may check whether the operating channel is occupied by a signal/channel of another wireless device. If the operating channel is occupied by another wireless device, the wireless device may perform a random back-off operation. If the operating channel is identified as not being occupied by another wireless device as a result of the LBT, the wireless device may occupy the operating channel. In the present disclosure, occupancy of the operating channel is referred to as 'channel occupancy (CO)'.

A wireless device wishing to perform SL communication in an unlicensed band may secure a CO by performing the LBT. Configuration of the CO may vary depending on a type of the LBT performed by the wireless device. The configuration of the CO may include the maximum length of the CO. Therefore, the maximum length of the CO may vary depending on a type of the LBT performed by the wireless device.

The type of the LBT may vary depending on a priority class of data that the wireless device wishes to transmit within the CO. When there are two or more types of priority classes of data, the wireless device may perform different types of LBT to obtain a CO suitable for the priority classes of the data. LBT schemes may vary depending on parameters that determine a time during which the LBT is performed.

As described above, when performing the LBT, the wireless device may perform a back-off procedure to check channel occupancy of another wireless device. The random back-off operation described above may be a type of the back-off procedure.

When the wireless device performs the LBT, if the wireless device performs a random back-off operation due to the operating channel being occupied by another wireless device, the minimum and/or maximum size of a contention window for extracting a random back-off counter may be set differently for each priority class.

When the wireless device performs the LBT, a fixed time period for performing the LBT may be predetermined. The length of the fixed time period may use either a first time value or a second time value greater than the first time value. For example, the first time value may be determined to be 16 us, and the second time value may be determined to be 25 us. Although the present disclosure exemplifies the case where two fixed time values (e.g. the first time value and the second time value) are used, three or more time values may be used if more LBT types are needed. In addition, the first and second time values exemplified as 16 us and 25 us are values to aid understanding of the present disclosure, and may be changed as needed.

In the present disclosure described below, three LBT types will be defined and described. An LBT that requires a random back-off procedure may be defined as 'LBT-Type-A', an LBT with a fixed time length of 25 us may be defined as 'LBT-Type-B', and an LBT with a fixed time length of 16 us may be defined as 'LBT-Type-C'. The LBT-Type-A may be referred to as 'random back-off LBT', the LBT-Type-B may be referred to as 'first fixed time LBT', and the LBT-Type-C may be referred to as 'second fixed time LBT'.

As described above, in the LBT-Type-A, configuration of the CO (e.g. the length of the CO) may vary depending on the LBT type or LBT parameters. Although both the LBT-Type-B and LBT-Type-C are defined as LBT types, the LBT-Type-B and LBT-Type-C may mean operations in which the wireless device does not actually transmits any signal/channel for a fixed period (e.g. 16 us or 25 us) without performing the LBT.

A wireless device that has performed the LBT, for example, a transmitter, may transmit LBT parameters including CO information to other wireless devices, for example, receivers. The CO information may include LBT parameters used by the transmitter to perform the LBT. The LBT parameters may include priority class information.

A receiver that has received the CO information from the transmitter may identify the LBT parameters used by the transmitter to obtain the CO from the CO information. The receiver may identify the priority class information for the corresponding CO based on the identified LBT parameters. In addition, the CO information obtained by the transmitter through the LBT may include one or more of a start time of the CO, a time length of the CO, or an end time of CO. The receiver may transmit a signal/channel to the transmitter at an arbitrary time during the CO based on the CO information included in the LBT parameters received from the transmitter.

[COT/COT Sharing]

Hereinafter, a channel occupancy time (COT) and COT sharing in sidelink communication will be described.

A transmitter may configure a COT based on an LBT of LBT-Type-A. The COT may indicate time resources, frequency resources, or time-frequency resources. The COT may also be referred to as 'CO' or 'channel occupancy resource (COR)'. Time-frequency resources in an unlicensed band may be shared with other wireless devices. Therefore, time-frequency resources through which a specific wireless device transmits signals may be discontinuous. In other words, in an unlicensed band, a signal/channel may be transmitted in form of a discontinuous burst. Here, the burst form may mean a transmission structure configured with one or more slots. Additionally, the burst form may mean a transmission structure composed of consecutive OFDM symbols with a length shorter than the slot length.

In SL communication, a transmission resource may be configured continuously or discontinuously during the COT. The transmitter may transmit an initial signal and/or a burst signal (e.g. PSSCH, PSFCH, PSCCH, reference signal (RS)) within the COT. The initial signal may be a duplicate symbol of the first symbol or a signal composed of a cyclic prefix (CP).

[Resource Block (RB) Set]

Hereinafter, resource block (RB) sets will be described.

In an unlicensed band, the LBT may be performed in a bandwidth (BW) unit. In the present disclosure, the bandwidth for LBT may be defined as 'LBT bandwidth (LBT BW)'. According to an exemplary embodiment of the present disclosure, the LBT BW may be 20 MHz. If a frequency domain size of an SL resource pool is larger than the LBT BW, the SL resource pool may be composed of multiple LBT BWs or multiple RB sets. If the SL resource pool is composed of multiple LBT BWs or multiple RB sets, a guard band (GB) may be configured between LBT BWs or between RB sets. The GB may be used for filtering between the LBT BWs or between the RB sets, and may be configured to have an arbitrary size, an arbitrary bandwidth, or an arbitrary number of PRB(s).

As previously described, an SL subchannel may be composed of one or more PRB(s). If a GB is not configured as an arbitrary number of PRBs, but is configured to have an arbitrary size or arbitrary bandwidth, some PRBs among PRBs included in a specific subframe or a part of an RB set included in a specific subframe may belong to the GB. If a part of an RB set included in a specific subframe belongs to the GB, PRBs belonging to the GB within the RB set may be excluded from a transmission block. In other words, PRBs belonging to the GB within the RB set may be not used for signal/channel transmission. Therefore, the number of PRBs of an RB set whose some PRB(s) belong to a GB may be different from the number of PRBs of an RB set whose PRBs do not belong to a GB. More specifically, the number N1 of PRBs in a first RB set in which some PRBs belong to a GB and the number N2 of PRBs in a second RB set not overlapping a GB may have different values. In other words, a subchannel including the first RB set may be composed of fewer PRBs than the number of PRBs in a subchannel including the second RB set.

The present disclosure proposes methods of using a subchannel including the first RB set in which some PRBs belong to the GB for purposes other than data transmission. In the present disclosure, a subchannel including the first RB set may be defined as 'common subchannel'. In the present disclosure described below, the common subchannel may be used by terminals to transmit arbitrary signals or sequences. The common subchannel may be considered in order to satisfy technical specifications requiring that more than a certain bandwidth needs to be occupied within the LBT BW.

[Sidelink Synchronization Signal Block (S-SSB)]

Hereinafter, sidelink synchronization signal blocks (S-SSBs) will be described.

An S-SSB may be transmitted through one slot, and a numerology according to BWP configuration or a specified numerology may be used for S-SSBs.

An S-SSB used in a licensed band is not multiplexed with other channels, such as PSSCH/PSCCH, in the frequency domain within the SL BWP. Hereinafter, S-SSB used in a licensed band will be described and referred to as 'licensed band S-SSB'. The licensed band S-SSB may be composed of 11 common RBs in the frequency domain and may be composed of 132 subcarriers. A frequency-domain position of the licensed band S-SSB may be defined or designated as a specific position within the SL BWP. Therefore, the receiver, for example, the terminal, may not need to perform blind detection to identify the position of the licensed band S-SSB. In addition, the licensed band S-SSB may not be included in the SL resource pool.

Hereinafter, an unlicensed band S-SSB will be described. An unlicensed band S-SSB refers to 'S-SSB used in an unlicensed band'.

In order to transmit an unlicensed S-SSB, the transmitter needs to perform the LBT, and may need to occupy a certain frequency resource within the RB set. If the channel is identified as being occupied by another wireless device as a result of the LBT, the transmitter may not be able to transmit an unlicensed band S-SSB.

The S-SSB acts as a very important element because it is used to acquire and maintain synchronization in SL communication. In addition, since the transmitter and receiver can mode during SL communication, it is more important to maintain synchronization through S-SSB transmission even in communication between wireless devices that have already acquired synchronization. However, as described above, if the channel is identified as being occupied by another wireless device as a result of the LBT in an unlicensed band, a problem may occur in which the transmitter cannot transmit S-SSB in the unlicensed band. Therefore, in order to transmit an unlicensed band S-SSB, additional S-SSB transmission resources and/or additional S-SSB transmission occasions need to be configured in the unlicensed band.

In addition, when providing additional S-SSB transmission resources or additional S-SSB transmission occasions in the unlicensed band, the transmitter may need to occupy more than a certain percentage of the operating channel in order to announce that S-SSB is being transmitted in the corresponding resources. This is because other wireless devices check whether the operating channel is being occupied based on a received power of the S-SSB. Accordingly, the transmitter may transmit additional S-SSBs using more than a certain number of PRBs (e.g. 11 PRBs) in a predetermined frequency region in order to enable other wireless devices to recognize channel occupancy.

In addition, additional S-SSB(s) may be transmitted not only in the frequency domain but also in the time domain. In relation to the LBT, the number of additional S-SSB transmission occasions in the time domain and/or the position of the additional S-SSBs in the time domain may be predefined or configured through a higher-layer message.

The number of additional S-SSB transmission occasions in the time domain may be determined by a parameter sl-NumSSB-WithinPeriod within the higher layer message (e.g. RRC message). In the present disclosure, the parameter sl-NumSSB-WithinPeriod will be referred to as 'S-SSB number (or count) parameter'. The S-SSB number parameter may include information on the number of additional S-SSBs in the time domain for transmitting the additional S-SSBs. For example, depending on a frequency range and an SCS of an unlicensed band, the number of additional S-SSBs may be set to have one or more values. Therefore, the terminal that has received the higher layer message including the additional S-SSB number parameter may identify the additional S-SSB number parameter and expect to receive additional S-SSBs indicated by the additional S-SSB number parameter in the time domain. However, depending on a result of the LBT, the additional S-SSB(s) may not be detected in a certain period.

As another example, transmission of additional S-SSB(s) in the time domain may be indicated using another parameter of the higher layer message. The another parameter may be implicitly indicated based on one or two or more parameters used in the current 3GPP standard, or a new parameter may be defined and used as the another parameter. In the present disclosure, the parameter(s) indicating transmission of additional S-SSB(s) in the time domain will be described as 'additional S-SSB configuration information' or 'additional S-SSB configuration parameter'.

From the meaning of 'additional S-SSB', it can be seen that there is S-SSB(s) configured as basic S-SSB(s). The basic S-SSB(s) may mean S-SSB(s) transmitted based on the S-SSB number parameter described above. As an example, the basic S-SSB(s) may mean transmission occasion(s) of S-SSB(s) defined in a licensed band. As another example, the basic S-SSB(s) may mean transmission occasion(s) for S-SSB(s) that are already defined before configuring the unlicensed band S-SSB(s). Therefore, the additional S-SSB(s) may mean S-SSB(s) that are additionally transmitted according to the present disclosure in addition to the basic S-SSBs.

The additional S-SSB configuration information indicating additional S-SSBs may include an offset X indicating the number of S-SSBs to be added and a time offset Y. The number of additional S-SSBs transmitted in addition to transmission of the basic S-SSBs may be set to X. The X additional S-SSBs may be located based on the time offset Y. This will be described with an example as follows.

As an example, a case where X is 2 and Y is 2 may be assumed. Here, a unit of the time offset may be a slot. Based on the additional S-SSB configuration information with the above values, two additional S-SSBs may be transmitted based on the value of X (i.e. 2). In addition, based on the additional S-SSB configuration information with the above values, it can be seen that the additional S-SSBs have an offset of 2 slots from a specific reference position. In this case, the reference position may be a position of a basic S-SSB. Therefore, in the case where X is 2 and Y is 2, if the basis S-SSB is transmitted in a slot N, the additional S-SSBs may be transmitted as follows.

The first additional S-SSB may be transmitted in a slot N+2, and the second additional S-SSB may be transmitted in a slot N+4. If X and/or Y is 0, the terminal may expect that no additional S-SSB transmission occasion exists in addition to the basic S-SSBs.

Figure 9A:
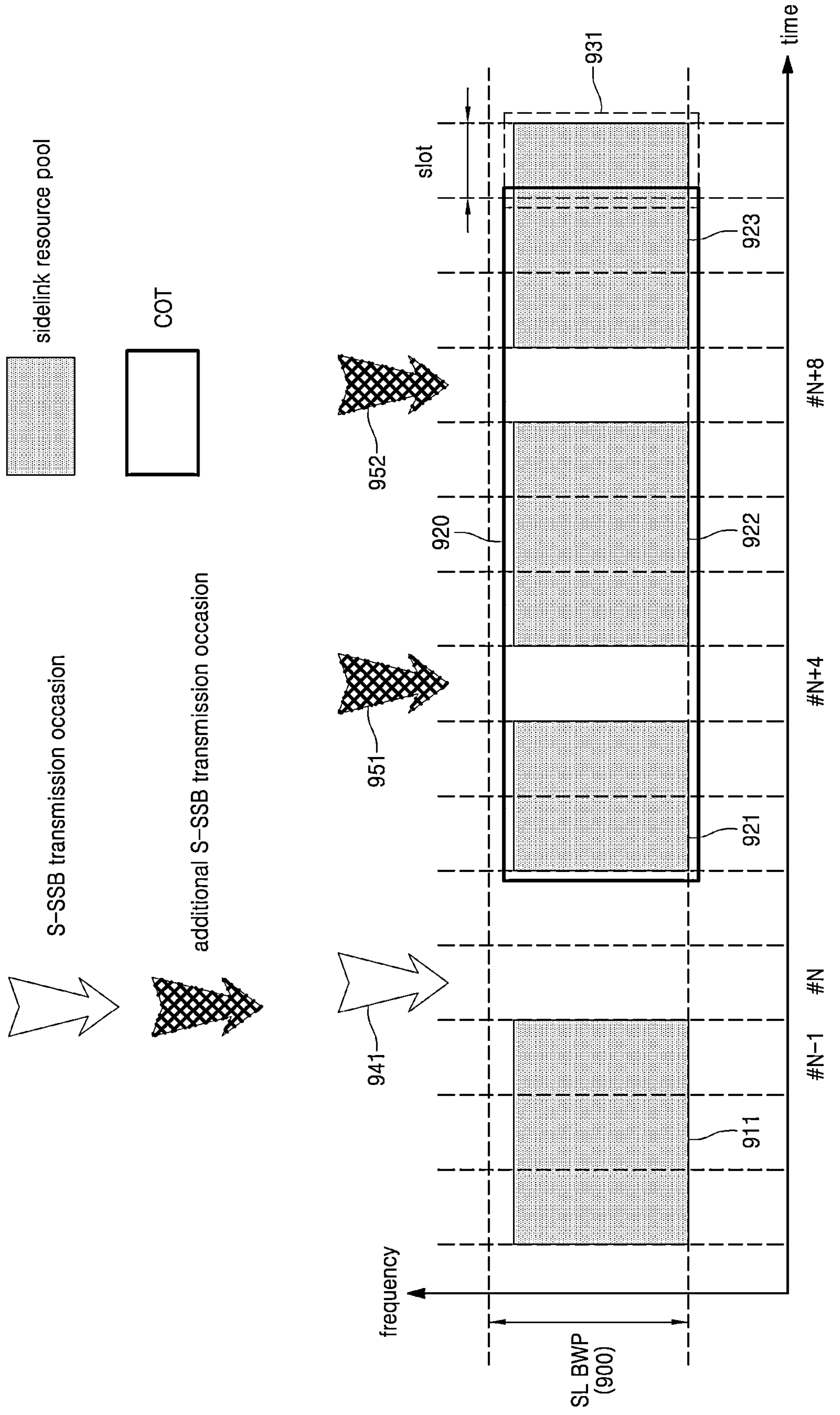
FIG. 9A is a conceptual diagram illustrating a temporal position at which additional S-SSB(s) according to the present disclosure are transmitted.

FIG. 9A is a conceptual diagram illustrating a temporal position at which additional S-SSB(s) according to the present disclosure are transmitted.

Referring to FIG. 9A, sidelink resource pools 911 and 931 not included in a COT and sidelink resource pools 921, 922, and 923 included in a COT 920 reserved by a specific transmitter through the LBT are illustrated. In FIG. 9A, a basic S-SSB occasion 941 and additional S-SSB occasions 951 and 952 are illustrated.

In the example of FIG. 9A, the number offset X is 2, and the time offset Y is 4 in the additional S-SSB configuration information. According to the case of FIG. 9A, the basic S-SSB occasion 941 may be a slot N. Since the time offset Y is 4 in the additional S-SSB configuration information, the first additional S-SSB may be transmitted in the first additional S-SSB occasion 951 of a slot N+4 which is located four slots after the basic S-SSB occasion 941. In addition, since the number offset X is 2 in the additional S-SSB configuration information, the second addition S-SSB may be transmitted in the second additional S-SSB transmission occasion 952 of a slot N+8 which is located four slots after the first S-SSB occasion 951.

Meanwhile, as described above, since S-SSBs are not included in the resource pool, definition of S-SSB transmission for the case where a COT is shared with other terminals may be needed. The basic S-SSB transmission occasion 941 and/or additional S-SSB transmission occasions 951 and 952 may be included in the COT 920 occupied (or reserved) by a specific transmitting terminal. The inclusion of the S-SSBs during the COT 920 may mean that the COT 920 is determined based on slot(s) or time without considering the resource pool, rather than being determined based on the resource pool.

In the case where S-SSB transmission occasions are configured within the COT 920, if a signal (e.g. PSSCH/PSCCH) is transmitted in a slot immediately after the S-SSB transmission occasion, a cyclic prefix length of the PSSCH/PSCCH may be defined to have a cyclic prefix extension (CPE) length. In the case where S-SSB transmission occasions are configured within the COT 920, the terminal that initiated or shared the COT may transmit information on whether the CP length of the PSSCH/PSCCH transmitted in the slot immediately after the S-SSB transmission occasion has a CPE length or a general CP length by including it in COT information. Here, the COT information may include at least one of slot configuration information of the COT, information on the additional S-SSB transmission occasions, or information on whether to extend the CP of the PSSCH/PSCCH transmitted in the slot immediately after the additional S-SSB transmission occasion. As another example, it may be defined or configured that the CPE is configured after performing the LBT-Type-C based on a start time of a guard symbol of the additional S-SSB transmission occasion slot. In addition, the COT information may be the same as the CO information described above or may further include the CO information.

In the case where S-SSB transmission occasions are configured with the COT 920, the basic S-SSB may be expected to be transmitted regardless of the COT 920. Further, additional S-SSBs may be transmitted regardless of whether the basic S-SSB is successfully transmitted. The terminal that initiated or shared the COT may transmit the additional S-SSB(s) to maintain the COT in S-SSB transmission occasion slot(s). As another example, the terminal that initiated or shared the COT may indicate an arbitrary terminal to perform S-SSB transmission within the COT to maintain the COT. Information indicating the S-SSB transmission may be delivered to the arbitrary terminal as being included in the COT information. The COT information may be transmitted by the terminal that initiated or shared the COT.

When transmitting additional S-SSB(s), a scheme for avoiding a collision between the additional S-SSB(s) and the basic S-SSB(s) transmitted by another terminal may need to be defined. In the present disclosure, a scheme of avoiding the collision with the basic S-SSB(s) by defining to transmit only some of the additional S-SSBs repeatedly transmitted in the frequency domain.

A higher layer message (e.g. RRC message) may include a parameter sl-AbsoluteFrequencySSB. The parameter sl-AbsoluteFrequencySSB indicates a frequency position of S-SSB which has an S-SSB transmission bandwidth and are located within the SL-BWP. In other words, the parameter sl-Absolute FrequencySSB may be a parameter indicating a frequency position of the basic S-SSB(s). In the present disclosure, the parameter sl-Absolute FrequencySSB will be referred to as 'basic S-SSB frequency position information' or 'basic S-SSB frequency position parameter'.

Therefore, in the present disclosure, if an additional S-SSB is transmitted in the same slot as a slot of a basic S-SSB, the additional S-SSB may be configured to be transmitted repeatedly at a frequency other than a frequency at which the basic S-SSB is transmitted based on the basic S-SSB frequency position information.

Figure 9B:
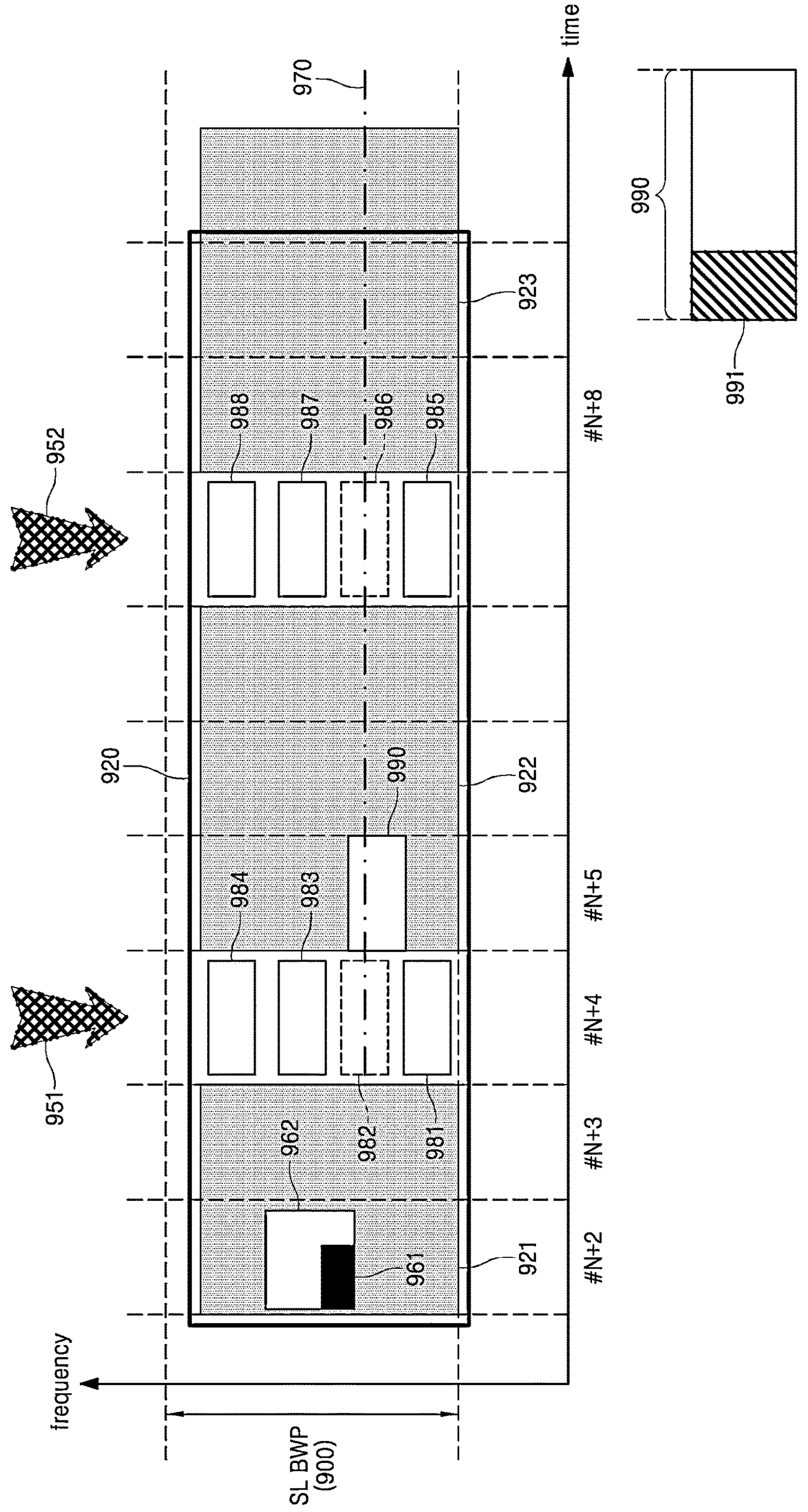
FIG. 9B is a conceptual diagram illustrating a method of transmitting additional S-SSB for collision avoidance according to the present disclosure.

FIG. 9B is a conceptual diagram illustrating a method of transmitting additional S-SSB for collision avoidance according to the present disclosure.

Before referring to FIG. 9B, it should be noted that FIG. 9B is a diagram illustrating only the COT 920 reserved through the LBT previously described in FIG. 9A. In other words, FIG. 9B illustrates an example to avoid a collision of the additional S-SSB transmitted within the COT 920.

FIG. 9B illustrates the sidelink resource pools 921, 922, and 923 included in the COT 920 reserved through the LBT within the SL BWP 900. In the COT 920, the first additional S-SSB transmission occasion 951 may be the slot N+4 as illustrated in FIG. 9A, and the second additional S-SSB transmission occasion 952 may be the slot N+8 as illustrated in FIG. 9A. In other words, X may be 2 and Y may be 4 in the additional S-SSB configuration information.

Referring to FIG. 9B, four additional S-SSBs 981, 982, 983, and 984 may be transmitted in the frequency domain. In this case, a case may occur where a frequency of a basic S-SSB transmitted by another terminal is the same as that of the first additional S-SSB transmission occasion 951 within the COT 920. In other words, if the basic S-SSB transmitted by the another terminal is transmitted in the slot N+4, a collision may occur with the first additional S-SSB according to the present disclosure.

To prevent such collision, in the present disclosure, based on the frequency position 970 of the basic S-SSB transmitted by another terminal, the additional S-SSB 982 to be transmitted at that position may be configured not to be transmitted. In FIG. 9B, when additional S-SSBs are transmitted in the first and second additional S-SSB transmission occasions 951 and 952, additional S-SSBs 982 and 986 overlapping with the frequency position 970 of the basic S-SSB are indicated with a dotted line to illustrate that they are not transmitted. Therefore, if the terminal that initiated or shared the COT indicates the terminal to transmit additional S-SSBs in the first and second additional S-SSB transmission occasions 951 and 952, another terminal (e.g. second terminal) scheduled to transmit additional S-SSBs in the S-SSB transmission occasions 951 and 952 may not transmit additional S-SSBs 982 and 986 that overlap the frequency position 970 of the basic S-SSB.

Meanwhile, as described above, in the case where a PSSCH/PSCCH is transmitted immediately after S-SSB transmission, a CPE may be used as a CP of the PSSCH/PSCCH. In other words, the PSSCH/PSCCH may use a CPE with a longer CP length than the general CP. The terminal that initiated or shared the COT may transmit a PSCCH 961 and a PSSCH 962 to a third terminal in the slot N+2. The PSCCH 961 transmitted in the slot N+2 may include information indicating the third terminal to transmit a PSCCH/PSSCH 990 in a slot N+5. In this case, the PSCCH 961 may include CPE information for the PSCCH/PSSCH to be transmitted by the third terminal. The CPE information may indicate whether to use or not to use CPE. If the use of CPE is indicated, information on the length of the CPE may be further included. An example of a case where CPE is applied is illustrated at the bottom of FIG. 9B. A CPE 991 may be indicated by the PSCCH 961 transmitted in the slot N+2 by the terminal that initiated or shared the COT.

If the terminal that initiated or shared the COT indicates another terminal (e.g. second terminal) to transmit an additional S-SSB, the PSCCH 961 transmitted in the slot N+2 may include information indicating to transmit an additional S-SSB. The PSCCH 961 including information indicating additional S-SSB transmission may be transmitted to the second terminal that is to transmit the additional S-SSB.

The additional S-SSB may be composed of a plurality of symbols. Specifically, the additional S-SSB may include one physical sidelink broadcast channel (PSBCH) symbol, two sidelink primary synchronization signals (S-PSS) symbols, two sidelink secondary synchronization signal (S-SSS) symbols, eight PSBCH symbols, and one gap symbol that is referred to as a guard.

Hereinafter, additional S-SSBs in the frequency domain with respect to channel occupancy in an unlicensed band will be described.

Additional S-SSBs within one RB set may be configured by repeating A S-SSBs with an offset B in the frequency domain to occupy a certain ratio of the RB set. In this case, information A on the number of additional SSBs in the frequency domain and information B of an offset for the additional S-SSBs in the frequency domain may be transmitted to terminals through a higher layer message. The values A and B may be set using a basic S-SSB as a reference.

For example, in the frequency domain, up to A additional S-SSB(s) may be configured at a position spaced apart from the basic S-SSB by B PRBs. The PRB offset between additional S-SSBs may be defined as B. Here, the basic S-SSB may mean the S-SSB located at the position configured by the parameter sl-AbsoluteFrequencySSB, as described previously.

If additional S-SSBs are configured in PRB(s) belonging to the guard band between RB sets, the S-SSB(s) belonging to the guard band may not be transmitted.

According to an exemplary embodiment of the present disclosure, the basic S-SSB may start from the lowest PRB index. Here, the lowest PRB index may be the lowest PRB index constituting one RB set, the lowest PRB index excluding the PRB(s) belonging to the guard band in the RB set, or the lowest PRB index constituting the SL-BWP. In addition, as additional S-SSBs overlapping in the time domain are not transmitted, if the PRB(s) of the basic S-SSB configured by the parameter sl-Absolute FrequencySSB overlap PRB(s) of the additional S-SSB, the overlapping additional S-SSB may be configured not to be transmitted.

Another method of configuring additional S-SSBs in the frequency domain, the additional S-SSBs may be arranged in a frequency region (e.g. SL BWP) as being divided equally based on the number of additional S-SSBs to be transmitted in the frequency region. The number of the additional S-SSBs to be transmitted may be set by a higher layer message as described above. Therefore, when it is desired to transmit N additional S-SSBs within the SL-BWP, the frequency region (i.e. SL-BWP) may be divided into N S-SSB transmission regions equally. In the present disclosure, the SL-BWP is assumed as the frequency region, but the additional S-SSBs may be transmitted only in a frequency region within SL-BWP. Even when the additional S-SSBs are transmitted only in a frequency region (e.g. RB set) within the SL-BWP, the frequency region may be divided into N sub-regions depending on the number of the additional S-SSBs to be transmitted. In the above-description, 'SL-BWP' or 'frequency region within the SL-BWP' may be a frequency region excluding the guard band PRB(s).

A configuration to lower a Peak to Average Power Ratio (PAPR) may be further considered when transmitting additional S-SSBs in the frequency domain. For example, the PAPR can be lowered by determining an SL ID value (N_SL_ID) differently when configuring a cyclic shift of a sequence for S-PSS and/or S-SSS and/or an initial scrambling seed value of PSBCH. In other words, a different SL ID value may be set for each additional S-SSB. In order to set a different SL ID value for each additional S-SSB, values within a specific range may be sequentially assigned to the additional S-SSBs. The specific range for setting the SL ID values differently for the respective additional S-SSBs may be determined considering the total number of additional S-SSBs. For example, when three additional S-SSBs are transmitted, the SL ID values may be determined as in Equation 1 or Equation 2 below.

$$N\_SL\_ID = N\_SL\_ID\_1 + 336 * N\_SL\_ID\_2 + N\_SL\_ID\_3 \quad \text{[Equation 1]}$$

$$N\_SL\_ID = N\_SL\_ID\_1 + 336 * N\_SL\_ID\_2 + N\_SL\_ID\_3 * A$$

In Equations 1 and 2, '*' may denote a multiplication operation, A may denote the total number of additional S-SSBs, and N_SL_ID_3 may be a range value.

As another method for determining the value of N_SL_ID, an additional S-SSB index value may be further included. Here, the additional S-SSB index value may start from the lowest frequency region, and the additional S-SSB index value of the lowest frequency region may be set to zero (0). In addition, the frequency region may be RB set(s), SL-BWP, or PRB(s) of RB set(s) excluding PRB(s) belonging to a guard band.

As another method for determining the value of N_SL_ID, N_SL_ID for additional S-SSBs may be configured differently based on the basic S-SSB defined by the parameter sl-AbsoluteFrequencySSB parameter, which indicates the frequency position of the basic S-SSB. For example, a modulo operation for increasing or decreasing N_SL_ID values of additional S-SSBs adjacent to the basic S-SSB by 1 may be further included. In this case, the modulo operation may have the total number of additional S-SSBs configured in the frequency region as a modulus. In addition, N_SL_ID values of additional S-SSBs located at a higher frequency than the basic S-SSB may be defined to be increased, and N_SL_ID values of additional S-SSBs located at a lower frequency may be defined as negative values or modulo-operated values. Here, the frequency region may be RB set(s), SL-BWP, or PRB(s) of RB set(s) excluding PRB(s) belonging to a guard band.

As another example for lowering the PAPR, an additional offset value C may be considered in addition to the offset value B of additional S-SSBs. For example, a final offset for additional S-SSBs may be 'B+C'. Here, C may be a value within a certain range, a value among repeated values, or a value among values given sequentially. As an example of values repeated or given sequentially within a certain range, values of {−1, 0, 1} may be applied to additional S-SSBs.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a first terminal, the method comprising:

receiving, from a base station, a higher layer message including sidelink synchronization signal block (S-SSB) configuration information;

obtaining a channel occupancy time (COT) through a listen-before-talk (LBT) procedure in an unlicensed band;

transmitting, to a second terminal, COT information;

transmitting, to the second terminal, a basic S-SSB based on the S-SSB configuration information and the LBT procedure; and transmitting, to the second terminal, one or more additional S-SSBs based on the S-SSB configuration information, wherein the S-SSB configuration information includes first configuration information for the basic S-SSB, and second configuration information for the one or more S-SSBs.

2. The method according to claim 1, wherein the second SSB configuration information includes first information on a number of additional S-SSBs to be additionally transmitted in time domain within the COT.

3. The method according to claim 2, wherein the second configuration information further includes second information on a time offset of the additional S-SSBs from the basic S-SSB.

4. The method according to claim 1, wherein the second configuration information includes third information on a number of additional S-SSBs to be additionally transmitted in frequency domain and fourth information on a frequency offset of the additional S-SSBs.

5. The method according to claim 4, wherein the second configuration information is configured, such that an additional S-SSB having at least one physical resource block (PRB) overlapping in frequency with the basic S-SSB is excluded from transmission.

6. The method according to claim 1, wherein the COT information further indicates slot configuration information of the COT, and whether to extend a cyclic prefix (CP) of a signal transmitted in a slot immediately after a transmission occasion of an additional S-SSB.

7. The method according to claim 1, wherein the LBT procedure is one of a random back-off LBT procedure with a random back-off procedure, a first type LBT procedure using a preset first time value, or a second type LBT procedure using a second time value longer than the first time value.

8. The method according to claim 7, wherein the random back-off LBT procedure, the first type LBT procedure, or the second type LBT procedure is determined based on priority class information of data to be transmitted by the first terminal.

9. The method according to claim 1, wherein the COT information includes a start time of channel occupancy (CO), and the COT information further includes either a time length of the CO or an end time of the CO.

10. A first terminal comprising:

at least one processor configured to causes the first terminal to:

receive, from a base station, a higher layer message including basic sidelink synchronization signal block (S-SSB) configuration information in an unlicensed band;

obtain a channel occupancy time (COT) through a listen-before-talk (LBT) procedure in the unlicensed band; and transmit, to a second terminal, COT information;

transmit, to the second terminal, a basic S-SSB based on the S-SSB configuration information and the LBT procedure; and transmit, to the second terminal, one or more additional S-SSBs based on the S-SSB configuration information, wherein the basis S-SSB configuration information includes first configuration information for the basic S-SSB and second configuration information for the one or more S-SSBs.

11. The first terminal according to claim 10, wherein the second configuration information includes first information on a number of additional S-SSBs to be additionally transmitted in time domain within the COT.

12. The first terminal according to claim 11, wherein the second configuration information further includes second information on a time offset of the additional S-SSBs from the basic S-SSB.

13. The first terminal according to claim 10, wherein the second configuration information includes third information on a number of additional S-SSBs to be additionally transmitted in frequency domain and fourth information on a frequency offset of the additional S-SSBs.

14. The first terminal according to claim 13, wherein the second configuration information is configured, such that an additional S-SSB having at least one physical resource block (PRB) overlapping in frequency with the basic S-SSB is excluded from transmission.

15. The first terminal according to claim 10, wherein the COT information further indicates slot configuration information of the COT, and whether to extend a cyclic prefix (CP) of a signal transmitted in a slot immediately after a transmission occasion of an additional S-SSB.

16. The first terminal according to claim 10, wherein the LBT procedure is one of a random back-off LBT procedure with a random back-off procedure, a first type LBT procedure using a preset first time value, or a second type LBT procedure using a second time value longer than the first time value.

17. The first terminal according to claim 16, wherein the random back-off LBT procedure, the first type LBT procedure, or the second type LBT procedure is determined based on priority class information of data to be transmitted by the first terminal.

18. The first terminal according to claim 10, wherein the COT information includes a start time of channel occupancy (CO), and the COT information further includes either a time length of the CO or an end time of the CO.

19. A method of a second terminal, the method comprising:

receiving, from a base station, a higher layer message including basic sidelink synchronization signal block (S-SSB) configuration information in an unlicensed band;

receiving, from a first terminal, channel occupancy time (COT) information;

receiving, from a first terminal, a basic S-SSB based on the S-SSB configuration information and the COT information; and receiving, from the first terminal, one or more additional S-SSB based on the S-SSB configuration information and COT information, wherein the basic S-SSB configuration information includes first configuration information for the basic S-SSB, and second configuration information for one or more S-SSBs.

20. The method according to claim 19, wherein the second configuration information includes at least one of first information, second information or third information, the first information includes a number of additional S-SSBs to be additionally transmitted in time domain within the COT, the second information includes a time offset of the additional S-SSBs from the basic S-SSB, and the third information includes information includes a number of additional S-SSBs to be additionally transmitted in frequency domain and information on a frequency offset of the additional S-SSBs.

* * * * *